United States Patent
El Essaili et al.

(10) Patent No.: US 11,202,117 B2
(45) Date of Patent: Dec. 14, 2021

(54) METHODS FOR PERSONALIZED 360 VIDEO DELIVERY

(71) Applicant: Telefonaktiebolaget LM Ericsson (publ), Stockholm (SE)

(72) Inventors: Ali El Essaili, Aachen (DE); Tomas Frankkila, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/628,558

(22) PCT Filed: Jul. 3, 2017

(86) PCT No.: PCT/EP2017/066486
§ 371 (c)(1),
(2) Date: Jan. 3, 2020

(87) PCT Pub. No.: WO2019/007477
PCT Pub. Date: Jan. 10, 2019

(65) Prior Publication Data
US 2020/0177941 A1    Jun. 4, 2020

(51) Int. Cl.
*H04N 21/258* (2011.01)
*H04N 21/2668* (2011.01)
*H04L 29/06* (2006.01)

(52) U.S. Cl.
CPC ....... *H04N 21/2668* (2013.01); *H04L 65/602* (2013.01); *H04L 65/607* (2013.01);
(Continued)

(58) Field of Classification Search
None
See application file for complete search history.

(56) References Cited

U.S. PATENT DOCUMENTS

| 6,029,195 A | * | 2/2000 | Herz | G06Q 30/02 725/116 |
| 9,258,585 B1 | | 2/2016 | Chang et al. | |

(Continued)

FOREIGN PATENT DOCUMENTS

| WO | 2001/082023 A2 | 11/2001 |
| WO | 2017/060423 A1 | 4/2017 |

OTHER PUBLICATIONS

International Search Report and Written Opinion dated Nov. 14, 2017 issued in International Application No. PCT/EP2017/066486. (11 pages).

(Continued)

*Primary Examiner* — William J Kim
(74) *Attorney, Agent, or Firm* — Rothwell, Figg, Ernst & Manbeck, P.C.

(57) ABSTRACT

A method for personalizing a video stream for a user, wherein the video stream comprises a sequence of video frames having a format such that a user with a viewport is not able to view the whole content present in the video frames but only a part of the content present in the video frames, the method comprising: —determining user preference information which indicates which spatial part of content present in the video frames is of higher relevance than other parts of the content present in the video frames, —selecting a spatially more relevant part in the video frames having a higher viewing relevance compared to a remaining part in the video frames based on the determined user preferences, —indicating the spatially more relevant part in the video frames to a video providing entity from where the video stream is delivered to the user.

22 Claims, 13 Drawing Sheets

(52) U.S. Cl.
CPC ....... *H04L 65/80* (2013.01); *H04N 21/25808* (2013.01); *H04N 21/25891* (2013.01)

(56) References Cited

U.S. PATENT DOCUMENTS

| | | | |
|---|---|---|---|
| 9,305,268 B2 | 4/2016 | Wu et al. | |
| 9,516,225 B2* | 12/2016 | Banta | H04N 5/23238 |
| 9,723,223 B1* | 8/2017 | Banta | H04N 21/21805 |
| 9,743,060 B1* | 8/2017 | Matias | H04N 5/23238 |
| 10,062,414 B1* | 8/2018 | Westphal | H04N 21/23406 |
| 10,374,866 B1* | 8/2019 | Berg | H04L 67/101 |
| 10,390,063 B2* | 8/2019 | Hall | H04N 21/4667 |
| 10,779,014 B2* | 9/2020 | Han | H04N 21/4728 |
| 10,798,455 B2* | 10/2020 | Gilson | H04L 65/602 |
| 10,817,424 B1* | 10/2020 | Amrani | G06F 12/0891 |
| 2001/0001160 A1* | 5/2001 | Shoff | H04N 5/44543 725/51 |
| 2003/0061206 A1 | 3/2003 | Qian | |
| 2003/0192049 A1* | 10/2003 | Schneider | H04N 21/4314 725/51 |
| 2004/0128702 A1* | 7/2004 | Kaneko | H04N 21/233 725/137 |
| 2006/0015904 A1* | 1/2006 | Marcus | H04N 21/254 725/46 |
| 2007/0250861 A1* | 10/2007 | Angiolillo | H04N 21/47 725/46 |
| 2008/0133638 A1* | 6/2008 | Fischer | H04N 21/6582 709/201 |
| 2010/0034425 A1* | 2/2010 | Lin | G06T 7/20 382/103 |
| 2011/0083069 A1* | 4/2011 | Paul | H04N 21/25891 715/234 |
| 2012/0215903 A1* | 8/2012 | Fleischman | G06Q 50/01 709/224 |
| 2013/0141523 A1* | 6/2013 | Banta | H04N 21/47202 348/36 |
| 2013/0144728 A1 | 6/2013 | Ruarte et al. | |
| 2016/0192003 A1* | 6/2016 | Casagrande | H04L 65/4084 725/14 |
| 2017/0186219 A1* | 6/2017 | Xu | G06T 15/04 |
| 2017/0195615 A1* | 7/2017 | Han | G06F 3/04883 |
| 2017/0289593 A1* | 10/2017 | Li | H04N 21/2408 |
| 2018/0063504 A1* | 3/2018 | Haines | H04N 7/183 |
| 2018/0077451 A1* | 3/2018 | Yip | H04N 21/4104 |
| 2018/0160123 A1* | 6/2018 | Van Der Auwera | H04N 19/513 |
| 2018/0357245 A1* | 12/2018 | Garg | G06T 13/80 |

OTHER PUBLICATIONS

DASH-IF, "Guidelines for Implementation: DASH-IF Interoperability Points", v3.22, May 2016, 157 pages.
Rajashekar et al. "Foveated Analysis and Selection of Visual Fixations in Natural Scenes," 2006 International Conference on Image Processing, Atlanta, GA, 2006, pp. 453-456.
Turban et al. "Extrafoveal Video Extension for an Immersive Viewing Experience," in IEEE Transactions on Visualization and Computer Graphics, vol. PP, No. 99, Dec. 2015, pp. 1-14.
N 16191, "ISG/IEC23001-10:2015/FDAM 1" Information technology—MPEG systems technologies—Part 10 Carriage of timed metadata metrics of media in ISO base media file format / Amd 1 Carriage of spatial information Jun. 2016, 8 pages.
Niamut et al. "MPEG DASH SRD—Spatial Relationship Description", MMSys'16, May 10-13, 2016, Klagenfurt, Austria, 3 pages.
International Standard ISO/IEC 23009-1, Second edition, May 15, 2014 "Information technology—Dynamic adaptive streaming over http (DASH)—Part 1: Media presentation description and segment formats" Apr. 2014, 152 pages.

* cited by examiner

METHODS FOR PERSONALIZED 360 VIDEO DELIVERY

CROSS REFERENCE TO RELATED APPLICATION(S)

This application is a 35 U.S.C. § 371 National Stage of International Patent Application No. PCT/EP2017/066486, filed Jul. 3, 2017, designating the United States.

TECHNICAL FIELD

The present application relates to a method for delivering a personalized video stream for a user and to the corresponding personalization entity. The application furthermore relates to a method for operating an edge server in a content delivery network and to the corresponding edge server. Furthermore, a system comprising the edge server and the personalization entity, and a computer program comprising program code is provided together with a carrier comprising the computer program.

BACKGROUND

The delivery of personalized video streams or media content which are tailored to the view of the user poses new challenges for media delivery systems. In the following a video stream can be a 360 degree video stream or any other video stream in which the viewport of the user is not able to view the whole content present in the video stream due to it size.

The delivery of a high-quality video is challenging. By way of example a 360 degree video is delivered at 4K resolution for full video which results in insufficient quality in the field of view or viewport such as 1K per eye, wherein the video stream may be displayed on a head mounted display, HMD. A higher quality such as a 8K resolution would be desirable.

It is desirable to provide high quality of experience (QoE) for video streams. Given the known technology in video coding and consumer devices, it is expected that high-quality video streams will be available in the near future. A challenge is to optimize the delivery of such a high-quality video stream given the bandwidth requirements of a high-quality video content having a viewport which is smaller than the whole width of the provided content. The delivery of the video stream should also ensure that the motion to photon latency which is the time between head movement and the newly displayed scene as rendered and the display remains low, e. g. below 20 ms in order to avoid a poor quality of experience or a motion sickness for the user.

There are different approaches for delivering such a video content to the user. One approach is to send the complete video content such as the complete 360 degree video to the client. The client decodes the video and renders the current viewport on a display to the user, e.g. a head mounted display. However, the viewport, which is the area the user watches, only correspond to a certain percentage such as 12 to 14% of the full 360 degree video frame. This means that the user does not watch a large portion of that decoded video, which means that both processing power and transport bandwidth are wasted.

As an alternative approach only the viewport part of the video is sent to the user and the remaining part of the video is not sent. This however requires that the viewport is updated with low latency once the user changes the viewport in order to avoid motion sickness for the user.

Other approaches are possible including sending the full video at low quality and the viewport part of the video at high quality to the user's device or sending a larger area and not the full video to the user device instead of the viewport only, e.g. based on tiling.

In 360 degree video delivery a frame is projected onto a 2D plane for encoding, packaging and transmission. Different protection mechanisms have been considered including cube map projection or pyramid protection. As shown in FIG. 1, a cube map projection uses a sphere 10 which is located around a video camera which films the scene and the 360 degree environment. This sphere is than projected onto a 2 dimensional plane resulting in six different regions 11 to 16. The projection type may be signaled to the user in order to decode and render the video.

In case of a tiled approach, the video is divided into tiles as shown in FIG. 2 which can be independently decoded at the user. The video frame 20 is divided into different tiles 21, 22 etc. which can be independently decoded at the user. A subset of the tiles including the users viewport is delivered to the user. An example is shown in FIG. 2. The viewport 25 covers a certain part of the tiles and a region 26 covering the tiles in which the viewport is located is delivered to the user. It is possible to deliver the tiles at different qualities, e.g. the full video frame such as the 360 degree frame can be delivered at the lower basic quality and the tiles which fall within the viewport of the user are retrieved at higher quality. When the user moves the head, and thereby sees another viewport, then a different set of high quality encoded tiles need to be delivered to the user. This, however, requires signaling from the client to the network entity that delivers the tiles. If the delay is too long, than the user will see tiles encoded with low basic quality which will again result in a degraded experience.

Furthermore, Dynamic Adaptive Streaming over HTTP, DASH, is known which is an adaptive bit rate technique allowing streaming of media content over the Internet from HTTP webservers. DASH spatial relation description, SRD, allows to express spatial relationships between spatial objects such as tiles or regions of interest (ROIs). SRD describes how the content is spatially defined to allow the client to download the relevant part of the content from a server. The spatial parts of the video are represented in a 2D coordinate system providing X, Y, width and height attributes. A source ID is used to identify the content, wherein identical values of source ID indicate that the video parts belong to the same reference system and different values of source ID mean that the video parts have no spatial relation to each other. It is possible to signal the tiles or the region of interest within the DASH stream. The standard specifies how spatial content represented by region of interest coordinates can be carried in an ISO Base Media File Format.

3 GPP TS 26.114 also describes how the use of ROIs can be negotiated in a SDP (Session Description Protocol) and signaled in the RTP, Real-Time Transport Protocol, media stream.

Summarizing the delivery of a video stream that has a format larger than a viewport of a user is challenging as the delivering of the full video stream at high resolution such as 4K or 8K requires a very high bandwidth. Furthermore, if the video providing server only sent the viewport with high resolution and the other regions with a low resolution than they would be a long delay when the user moves his head until the new viewport is available at high quality which causes a poor quality of experience.

Accordingly, a need exists to avoid at least some of the above mentioned drawbacks and to improve a method for presenting video streams having a format larger than a viewport of a user to a user.

SUMMARY

This need is met by the features of the independent claims. Further aspects are described in the dependent claims.

According to a first aspect a method for personalizing a video stream for a user is provided wherein the video stream comprises a sequence of video frames having a format such that a user with a viewport is not able to view the whole content present in the video frames, but only a part of the content present in the video frames. According to one step user preference information is determined which indicates which spatial part of the content present in the video frames is of higher relevance to this user than other parts of the content present in the video frames. Furthermore, the spatially more relevant part in the video frames having a higher viewing relevance for this user is selected compared to the remaining part in the video frames based on the determined user preferences. Furthermore, the spatially more relevant part individual frames is indicated to a video providing entity from where the video stream is delivered to the user.

With the use of the user preferences it is possible to provide a better personalization of the video stream to the user and provide a more efficient delivery of personalized video to the users. By considering the user preferences, a personalized video can be delivered where parts of the video frames which are present to the user are encoded at a higher resolution compared to the parts of the video frames which are not present to the user.

Furthermore, the corresponding personalization entity is provided configured to personalize the video stream for the user wherein the personalization entity comprises a memory and at least one processing unit, the memory containing instructions executable by the at least one processor and wherein the personalization entity is operative to operate as discussed above or as explained in more detail below.

Furthermore, a method for operating an edge server in a content delivery network is provided, wherein the edge server transmits the video stream to a user, wherein the video stream comprises a sequence of video frames having a format such that a user with a viewport is not able to view the whole content present in the video frames but only a part of the content present in the video frames. The edge server determines a spatially more relevant part in the video frames having a higher viewing relevance to this user compared to a remaining part in the video frames, the spatially more relevant part indicating which spatial part of a content present in the video frames is of higher relevance to this user than other parts of the content present in the video frames. The edge server furthermore adds a priority information to metadata of the video stream, the priority information allowing the spatially more relevant part in the video frames to be identified by other edges or by the user device, and transmits the video stream with the added priority information to the user.

Additionally, the corresponding edge server is provided, the edge server comprising a memory and at least one processing unit, the memory containing instructions executable by the at least one processor, wherein the edge server is operative to work as indicated above or described in detail below.

Furthermore, a system comprising the personalization entity and the edge server is provided.

Furthermore, a computer program is provided comprising a program code to be executed by at least one processing unit the personalization entity wherein execution of the program code causes the at least one processor to execute a method as discussed above or discussed in more detail below.

Additionally, a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present application. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
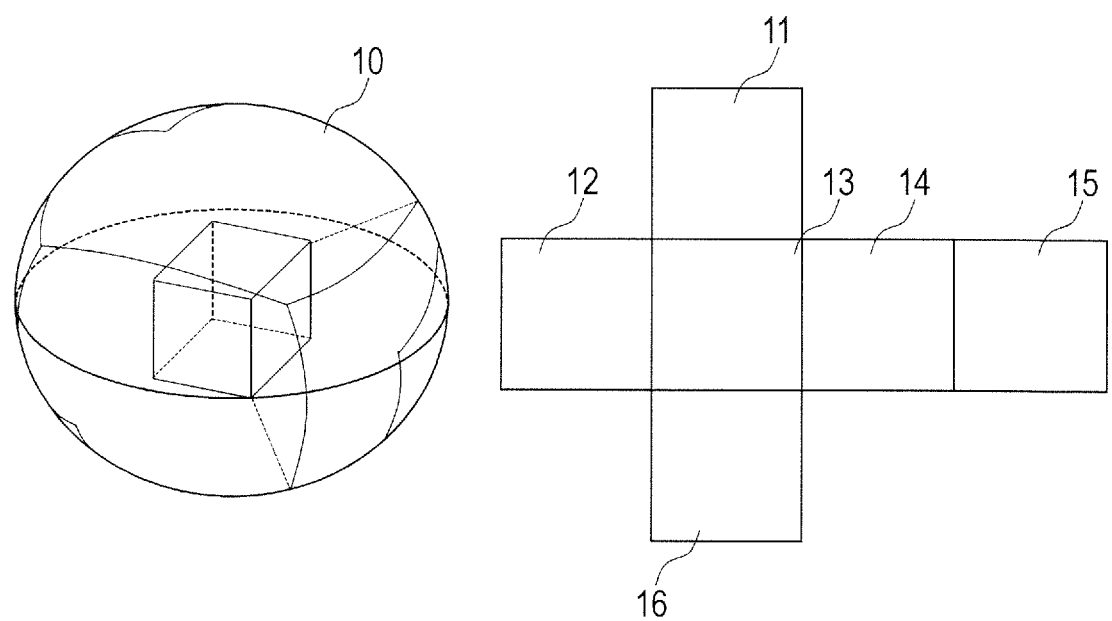
FIG. 1 shows an example system in which a video recording entity records a video in a format larger than a viewport of a user.
Figure 2:
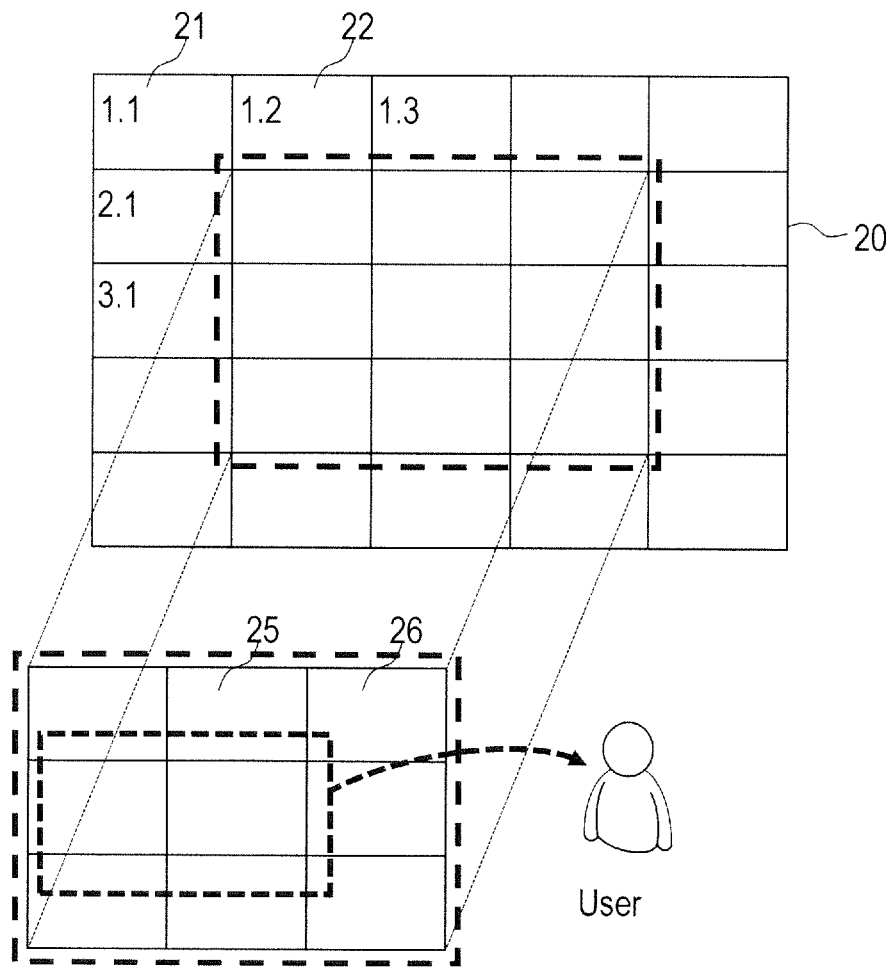
FIG. 2 shows an example of how a video frame of a video stream is divided into tiles wherein only some tiles contain the viewport of the user.

In the following embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather the various elements are represented such that their function and general-purpose becomes apparent to a person skilled in the art. Any connection or coupling between functional blocks, devices, components of physical or functional units shown in the drawings and described hereinafter may also be implemented by an in directed connection or coupling. A coupling between components may be established over a wired or wireless connection. Functional blocks may be implemented in hardware, software, firmware, or a combination thereof.

In the following different embodiments will be described. In a first embodiment a video stream is personalized which leverages information about user preferences and viewing history. In a further embodiment a local personalization entity located at an edge server located at an edge of a content delivery network or located close to the edge server is used. In a further embodiment crowd-triggered replays and interactive video streams are discussed. In a further embodiment an improved prefetching procedure for the video stream is discussed and in another embodiment the personalization of a video stream is extended to multichannel video delivery.

The information about the spatially more relevant part in the video frames which has a higher viewing relevance compared to the remaining part in the video frames may be encoded as priority information in the media presentation description, MPD, by extending the DASH SRD fields. The priority information may be used by the content delivery network and the client to fetch and optimize the delivery of personalized content to the user. In the following context a video stream may be a 360 degree video stream, but may also mean a 180 degree video stream, a spherical video or a panoramic video. The video stream with a consecutive sequence of video frames has a format such that a user with a viewport is not able to view the whole content present in the video frames. The video stream has a format such that the user may have to scroll up or down or left or right to see other parts of the video frames as not the whole video frame can be viewed by the user. The video stream including media content may furthermore include an augmented reality, AR, a virtual reality, VR, information or other overlays which are tailored to the view of the user.

The personalization of a video stream may mean that a complete 360 degree video content is created or encoded or part of the video stream is created and encoded take into account the user preferences or the viewing history of the video stream. One example is viewport coding with higher resolution, whereas the spatially not more relevant part, thus the remaining part is encoded with a lower resolution. Furthermore, the personalization may mean that personalized information is added to the content or at least to parts of the content which fall in the viewport or close proximity of the viewport that fits the user preferences such as color scheme, language, overlays etc. In these cases the users will get different content which is tailored to their preferences. Personalization can also mean that several users are watching the same video content but each user is interested in a different viewport. By way of example a helicopter flying through the Grand Canyon and making a 360 degree video is provided and two users are watching the video stream, but one is looking to the left and one is looking to the right.

Figure 3:
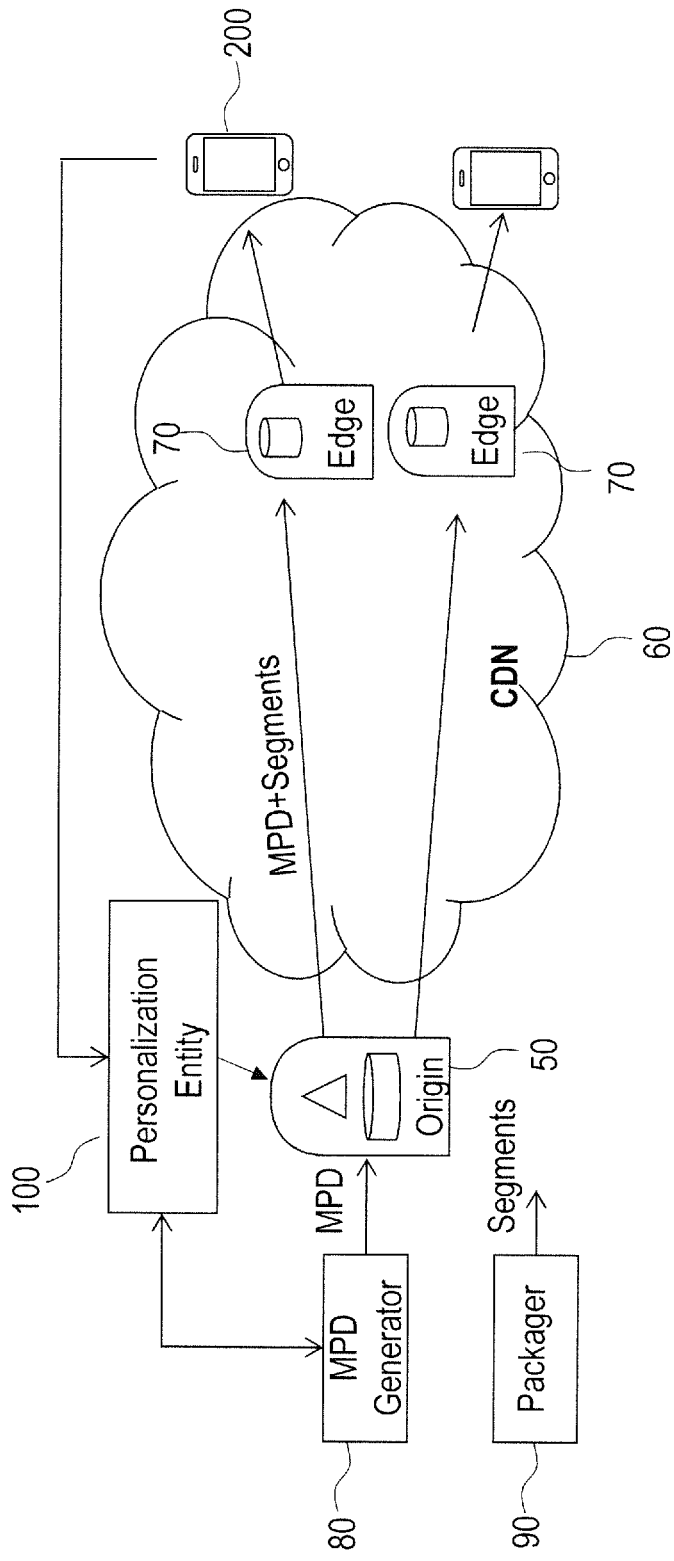
FIG. 3 shows an example architecture view of a system including a personalization entity configured to personalize a video stream for a user.

FIG. 3 shows an overview of a system in which a personalization entity 100 is used to indicate the spatially more relevant parts of a video frame to a video providing entity represented by an origin server 50 and/or an edge server 70 based on user preference information. The video stream is delivered through a content delivery network, CDN 60 to a user entity 200 which in the example shown is indicated as a mobile entity. The mobile entity may be a telephone type of device such as a cellular telephone, mobile station, a cordless phone, a personal digital assistants type of device like a laptop, notebook, notepad or a tablet equipped with a wireless data connection. However, the user entity may also be a head mounted display or any other display on which at least a part of the video stream can be displayed.

The video stream is provided through edge servers 70 provided in the content delivery network 60. The personalization entity 100 uses user preference information such as a long-term user preference indicating the spatially more relevant parts determined based on viewing habits detected when viewing other video streams in the past. The personalization system may furthermore take into account a short-term user preference which indicates the spatially more relevant parts in earlier video frames of the same video stream. This information is in the example shown provided to the video providing entity, here the origin server 50. Furthermore, a generator 80 for generating the media presentation description MPD is provided wherein the media presentation description includes the meta data of the video stream, wherein a packager 90 provides the viewing segments or frames to the video providing entity 50. The personalization entity 100 interacts with the MPD generator 80 to generate the personalized MPD for each user.

Figure 4:
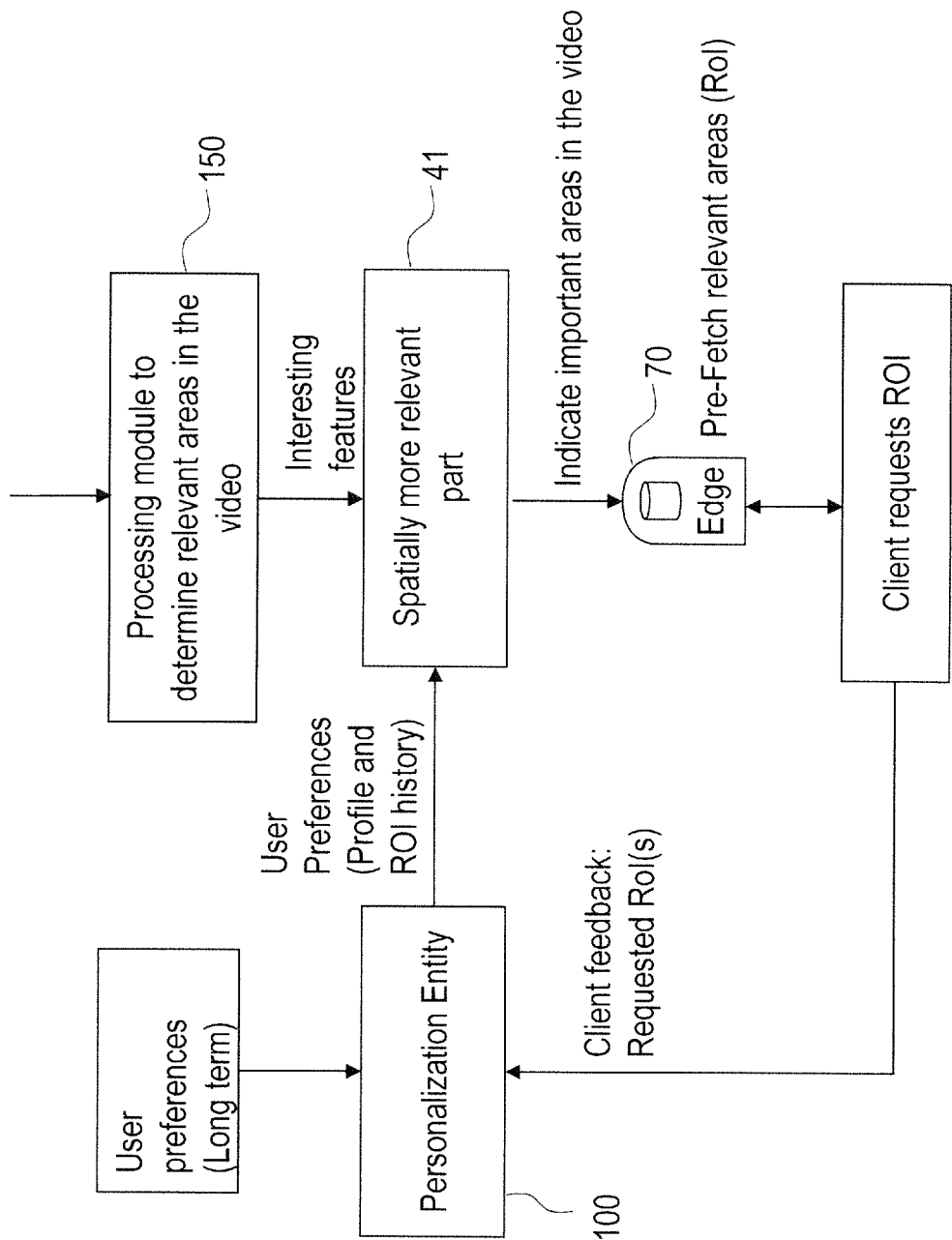
FIG. 4 shows an example schematic representation of how a video stream is personalized for user based on user preference information and consumption behavior.

In connection with FIG. 4 a first embodiment is described in which the delivery of the video stream is improved by jointly considering the video content characteristics of the video stream to determine which areas in individual streams are likely to attract the attention of the user and considering the user preferences which are provided by the personalization entity 100. The user preference information can include both static or long-term information about a user and a dynamic or short-term information which can be assessed from the history of earlier viewed frames of the same video stream. The client user entity 200 can have an interface to the personalization entity 100 such that an eye tracking system or an accelerometer is provided to indicate the region of interest to indicate the viewport the user is currently watching. Furthermore, the personalization entity can learn about the requested region of interest by analyzing the client requests. The full video stream is provided to a pre-processing module 150 which may be optionally provided. The pre-processing module may be part of the personalization entity 100 or may be a separate module. The pre-processing module may determine the relevant areas in the video frames. The relevant parts may be determined based on the assumption that the human visual system, HVS, processes smaller regions of the viewport with greater detail and the rest of the viewport includes peripheral information to the user. Image recognition approaches can detect which part of a scene is more relevant and is more likely to catch the users attention. These relevant parts may be determined by the pre-processing module 150, however module 150 may also be omitted. The personalization entity uses the long-term user preferences which are pre-stored in the personalization entity and the short term user preferences which take into account the currently viewed video stream in order to select the spatially more relevant part in the video frames which have a higher viewing relevance compared to the other parts in the video frames. The user preference can include the potential objects that are of interest to the user, such as a soccer player. The viewing history can include parts of the video such as a region of interest that has been recognized as relevant to the user based on his viewing experience. These spatially more relevant parts identified by the personalization entity 100 is symbolized by element 41 in FIG. 4. The output of the personalization entity indicates the spatially more relevant part of the video stream to the edge server 70 in the network 60. The edge server 70 can apply different procedures to fetch the relevant areas from the origin video providing entity 50. The spatially more relevant area may be pre-fetched to the edge server 70 so that the delay for transmitting the spatially more important part to the user may be reduced.

Pre-fetching can happen before the stream starts e.g. based on long term preferences. The short-term preferences are considered during the stream. It is possible that the spatially more relevant part may be provided at a higher resolution, at a higher frame rate and or at a higher encoding quality compared to the remaining part wherein the remaining part comprises the other part of the video frame not including this spatially more relevant part. The edge server can apply the information about the more relevant part to fetch the content in combination with other knowledge about the edge load and network conditions. Furthermore the fetching of the spatially more relevant part may be prioritized over the fetching of the remaining part.

Figure 5:
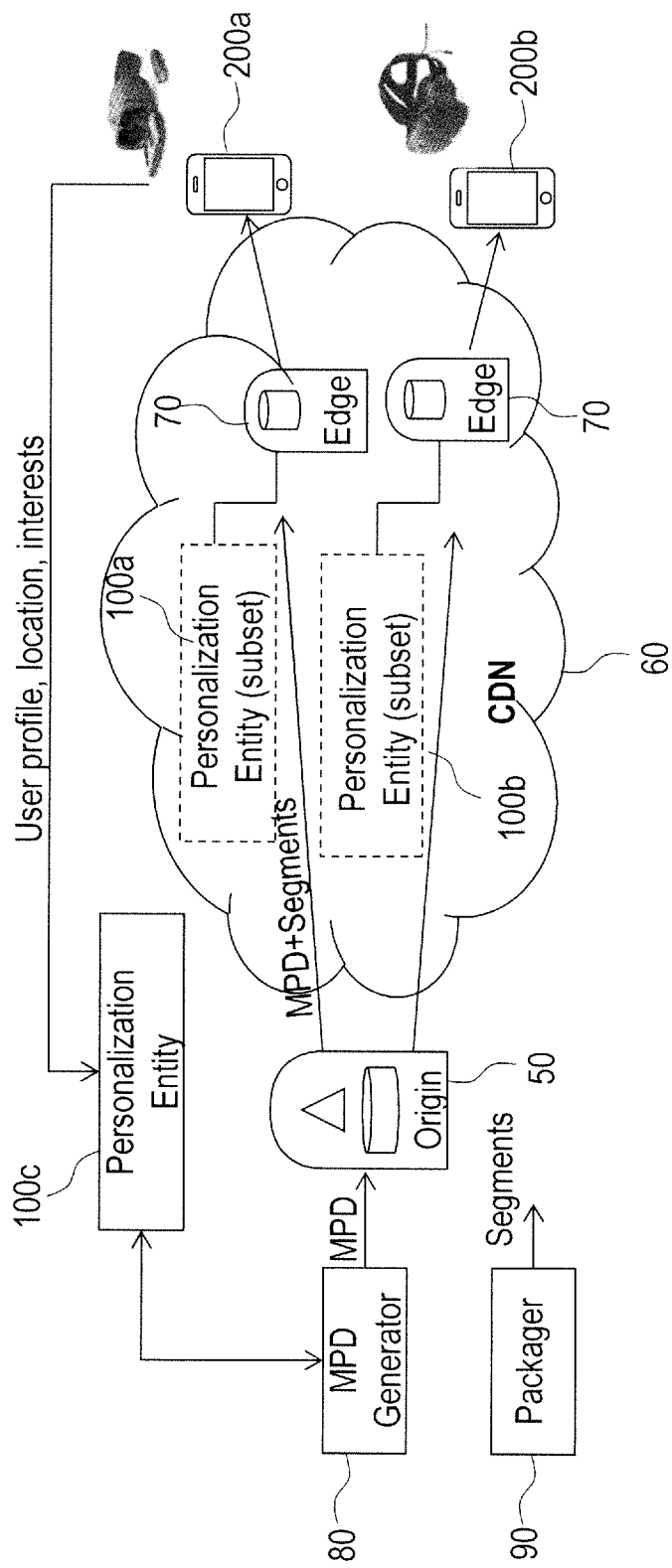
FIG. 5 shows a further example schematic architectural view of a system including a personalization entity configured to personalize the video stream for a user which is located in a content delivery network closer to the user.

FIG. 5 shows a further embodiment of the system similar to the embodiment shown in FIG. 3. The system shown in FIG. 5 differs from the system shown in FIG. 3 of the fact that the personalization entity or part of it is moved closer to the user entity 200 during streaming. The complete personalization entity may be located in the network 60 however it is also possible that a part of the personalization entity such as the entity 100*a* and 100*b* are located within the network whereas another part of the personalization entity is still located outside as shown by the personalization entity 100*c*. This allows the edge server 70 to interact with the personalization entity while minimizing the delay needed to determine the spatially more relevant part for the user. The personalization entity may be moved to the CDN 60 to provide a faster, more responsive and improved delivery of the video. The personalization entity can interact with the edge server 70 and provide personalization based on the region of interest as indicated by a user or as determined for a user based on eye tracking or based on user input. This means that different users get different content based on the user preference information. The entire personalization entity, at least the functionality or the database for the user can be moved temporarily to the network 60 when the session starts and then moved back to the origin outside the network when the session of the video stream has ended. Furthermore, it is possible that a portion of the personalization entity is moved to the network 60 where the portion that is moved to the network is selected based on the current video stream or media session. If the user is watching a football game, then the preferences related to this kind of video stream could be moved to the network whereas other less relevant information could be kept at the personalization entity 100*c* outside the network. Here the video stream is delivered with a personalized content to each of the users based on the user preferences at the local personalization entity provided for the corresponding user. In the embodiment shown personalization entity 100*b* or its functionality is moved to the network 60 for the user entity 200*b* whereas is a different personalization functionality 100*a* is provided within the network for the user entity 200*a*.

Figure 6:
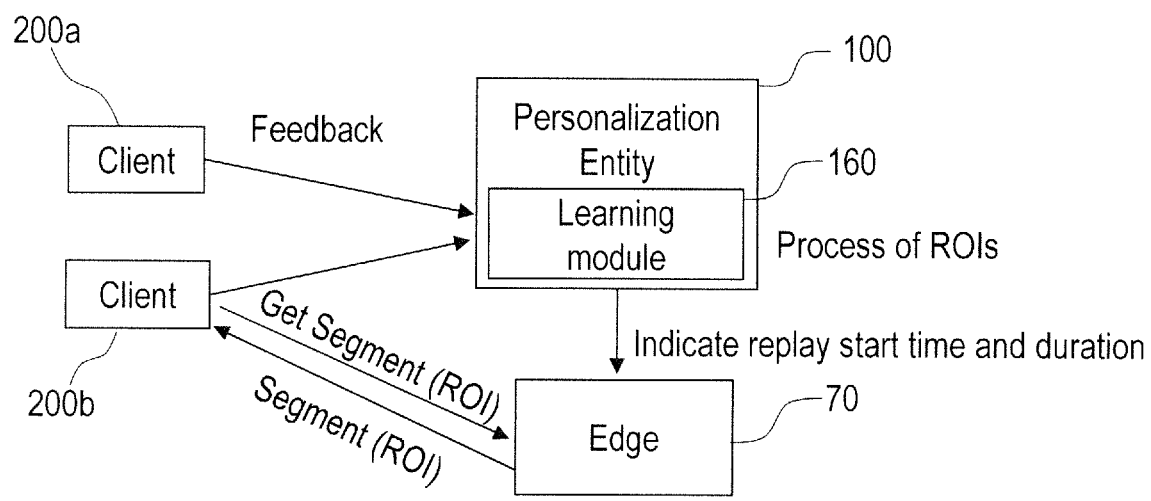
FIG. 6 shows an example schematic presentation of a personalization entity in which a crowd of users and their viewing habits help to personalize the video content.

A further embodiment is shown in connection with FIG. 6. In this embodiment the user preferences of different users are taken into account. Here the crowd of the different users were watching the same video stream and the spatially more relevant parts were determined for the other users and this information is used to generate the spatial and temporal areas in the video stream which may be of interest to the current user. The plurality of users may be watching the same content, either to the same time or earlier. Crowd-triggered replays may be generated in a situation where different users are watching the same content, e.g. a cross-country skiing competition. Sometimes, individual users want a replay of e. g. the last 30 seconds. If many users want a replay of the same or roughly the same period then the personalization entity may detect this and may automatically create a crowd-triggered replay based on a starting time, stop time, which camera is used, which individuals are captured in the video etc. The personalization entity then uses this information about the created replays and decides if it should be added to the list of replays that could be watched which is then provided based on user preference and/or a previous behaviour, by way of example if the user follows a certain athlete or individual. If the personalization entity 100 determines that the replay should be made available to the user, then it also stores the relevant information for the replay such as the starting time, and the duration of the replay. The user can then decide if and when he or she wants to see the replay. Accordingly replays are generated based on what a group of users was watching based on the feedback of the crowd of users. This information is collected and automatically generated replays are generated which could be watched by other users so that this information is also provided to the current user as spatially more relevant part. The learning about the replays watched by other users may be carried out in a learning module 160 schematically shown in FIG. 6 wherein different clients or users 200*a* and 200*b* were asking for different replays and thus provided a feedback about a region of interest to the personalization entity 100. The indicated replay may then be indicated by the personalization entity 100 to the edge server 70. In case of 360 degree video the viewport of the user may be needed since the representation of the replays may depend on what portion of the 360 degree video the user is currently watching.

By way of example if the user is watching straight ahead, then the normal media stream may be watched, but if another viewport is selected, by turning the head to the right or to the left or by scrolling the displayed video to the left or right or up or down, the automatically generated replay may be displayed. Furthermore, it is possible that when the user turns the head to the other direction, the user may see other information of the ongoing event such as statistics of the displayed content, e. g. a sport game.

Accordingly, this means that different pieces of information may be displayed to the user based on the viewing direction of the user. In this embodiment the personalization entity 100 knows where the users are looking at and what they are interested in wherein the personalization entity 100 provides replays which are tailored to the majority or to a group of users. The replay can have a spatial dimension meaning of which viewport the users are looking at, and can have a temporal dimension such as the start and duration of the replay. The personalization entity has an interface with the client or user entities 200 where it receives the feedback that indicates the region of interest. The feedback can, by way of example, come from an eye tracking system or can come from accelerometers in the client device which determines how the user moves the head. The learning module 160 may determine based on the feedback from other users which crowd-triggered replays are most relevant. When the personalization entity has created the crowd-triggered replays they may be made available to the edge server 70 so that they can be delivered immediately to the user if and when the user wants to consume them. Furthermore, it is possible that the personalization entity provided at the edge as shown in FIG. 5 has a learning module and determines which crowd-triggered replays are relevant.

Furthermore, the pre-fetching of the spatially more relevant parts of the video frame may be considered. This feature includes the pre-fetching of the content as described above based on the personalized users preferences and crowd-feedback, respectively. This can be used to create personalized channels that can be relevant for several users, which enables cache memories re-use in the content delivery network. The content delivery network fetches the personalized content to the right edges based on their proximity to the users so that it can be immediately delivered to the client when the user wants to consume it. For the present format of the video stream it is particular useful to control the pre-fetching since the personalization can assist in the selection of which tiles of the video stream or which region of interests are pre-fetched with higher quality than the other parts so that these parts can be delivered to the client or user with slow delay. Furthermore, it is possible to use other improved pre-fetching procedures such as fetching high quality ROIs or tiles with higher priority order.

In a further embodiment the content provider or video providing entity provides multiple channels to the user. One example is that there is one main video stream which is common for all users, but parts of the video, e. g. shown with thumbnails, picture-in-picture or overlays are personalized for the corresponding users. The user can switch to the personalized channel to retrieve personalized data or experience more personalized views. The above described methods can be applied to optimize the delivery of the personalized channels or a subset of the channels to each user. Furthermore, based on the knowledge of the user's view it is also possible to provide a personalized replay for the user.

The content provider may deliver the video streams such as programs, advertisements, home videos or YouTube clips etc. through multiple channels. Up to now the media presentation description MPD is not considering watching multiple programs at the same time. Different alternatives are possible for multiple channels: it is possible to use a single MPD, when the client fetches the main content and it receives the URLs for main content and the auxiliary channels. It can be personalized which channels the user receives, by way of example only a subset of the channels are of interest. Using different MPDs for different channels, the same principle can be applied. Personalized MPD can be generated at the origin and/or are updated in the network based on which personalized video streams are available at the edge.

The above described embodiment of the multichannels can be combined with the other embodiments described above. By way of example a user may be using a head mounted display to watch live sport events. When looking straight ahead the live content may be sent to the device, the head mounted display. When the user turns the head to one side than the latest replay is sent to the device as the accelerometer or the eye tracking system indicates to the network holder system that the user has turned the head. The system can then transmit the latest replay to the display device. If the user turns the head to the other side than other information such as statistics of the game may be displayed. The channels shown when the user turns the head may also show other channels ongoing in parallel.

The personalization entity can be located in the origin 50 as shown in FIG. 3 of 5 when the user is not consuming any media, but is then moved to the edge when the user starts consuming the video stream. When the user stops consuming the video stream the personalization entity is moved back to the origin. This can be particularly helpful for mobile users since the edge server and the associated cache changes when to users move in the network.

In the following it is explained how the DASH,-SRD (Spatial Relation Description), SRD may be extended to implement the above described features. The priority information of the region of interests or tiles may be placed into the SRD fields of the MPD. The priority information can be determined by the edge server 70 by analyzing the user requests or by the personalization entity. The MPD may be modified to indicate the ROI priorities. The priorities can be personalized for each user or group of users. In order to modify the MPD, the priority fields can be set at the edge server or at the origin by communicating it to the personalization entity. Table 1 shown below indicates an extension to the DASH SRD fields wherein a new field is proposed to indicate the importance of a spatial object be it a tile or a region of interest in the video stream. The newly added part is shown in bold letters.

| EssentialProperty@value or SupplementalProperty@value parameter | Use | Description |
| --- | --- | --- |
| source_id | M | non-negative integer in decimal representation providing the identifier for the source of the content |
| object_x | M | non-negative integer in decimal representation expressing the horizontal position of the top-left corner of the Spatial Object in arbitrary units |
| object_y | M | non-negative integer in decimal representation expressing the vertical position of the top-left corner of the Spatial Object in arbitrary units |

-continued

| EssentialProperty@value or SupplementalProperty@value parameter | Use | Description |
|---|---|---|
| object_width | M | non-negative integer in decimal representation expressing the width of the Spatial Object in arbitrary units |
| object_height | M | non-negative integer in decimal representation expressing the height of the Spatial Object in arbitrary units |
| total_width | O | optional non-negative integer in decimal representation expressing the width of the reference space in arbitrary units. At each Period and for a given source_id value, the following rules apply: There shall be at least one descriptor providing a value for the total_width parameter. If two or more descriptors provide different total_width values, all other descriptors shall explicitly provide the value of total_width. If the total_width value is provided in only one descriptor, all other descriptors are assumed to use that total_width value. The value of total_width shall be such that, for each descriptor using this value of total_width, the sum of object_x and object_width is smaller or equal to total_width. When the value total_width is present, the value total_height shall be present. |
| total_height | O | optional non-negative integer in decimal representation expressing the height of the reference space in arbitrary units. At each Period and for a given source_id value, the following rules apply: There shall be at least one descriptor providing a value for the total_height parameter. If two or more descriptors provide different total_height values, all other descriptors shall explicitly provide the value of total_height. If the total_height value is provided in only one descriptor, all other descriptors are assumed to use that total_height value. The value of total_height shall be such that, for each descriptor using this value of total_height, the sum of object_y and object_height is smaller or equal to total_height. When the value total_height is present, the value total_width shall be present. |
| spatial_set_id | O | optional non-negative integer in decimal representation providing an identifier for a group of Spatial Object. When not present, the Spatial Object associated to this descriptor does not belong to any spatial set and no spatial set information is given. When the value of spatial_set_id is present, the value of total_width and total_height shall be present. |
| Priority | O | optional non-negative integer in decimal representation indicating the importance of the spatial object. Assuming the priority value is represented by N bits: 0: Least important $2^N-1$: Most important When not present, the spatial objects have same importance. |

Legend:
M = Mandatory,
O = Optional

Table 2 shown below indicates how the additional priority fields may be added to the MPD. An HD video and four tiles is described in the MPD using SRD. The table includes the additional priority field which indicates that certain parts of the video stream such as tile 2 and 3 are more important to the user as indicated in bold. A 2-bit representation for the priority field is used in the example given below in table 2 the priority information being shown in bold.

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <ProgramInformation>
        <Title>Example of a DASH Media Presentation Description using Spatial Relationship Description to indicate tiles of a video</Title>
    </ProgramInformation>
    <Period>
        <!-- Main Video -->
        <AdaptationSet segmentAlignment="true" subsegmentAlignment="true" subsegmentStartsWithSAP="1">
            <Role schemeIdUri="urn:mpeg:dash:role:2011" value="main"/>
            <SupplementalProperty schemeIdUri="urn:mpeg:dash:srd:2014" value="0,0,0,2,2,2,2,0"/>
            <Representation mimeType="video/mp4" codecs="avc1.42c01f" width="1280" height="720" bandwidth="553833" startWithSAP="1">
                <BaseURL> full_video_hd.mp4</BaseURL>
```

```xml
            <SegmentBase indexRangeExact="true" indexRange="838-989"/>
        </Representation>
    </AdaptationSet>
    <!-- Tile 1 -->
    <AdaptationSet segmentAlignment="true" subsegmentAlignment="true"
subsegmentStartsWithSAP="1">
        <Role schemeIdUri="urn:mpeg:dash:role:2011" value="supplementary"/>
        <SupplementalProperty schemeIdUri="urn:mpeg:dash:srd:2014"
value="0,0,0,1,1,2,2,0"/>
        <Representation mimeType="video/mp4" codecs="avc1.42c01f" width="1280"
height="720" bandwidth="525609" startWithSAP="1">
            <BaseURL>tile1_video_hd.mp4</BaseURL>
            <SegmentBase indexRangeExact="true" indexRange="838-989"/>
        </Representation>
    </AdaptationSet>
    <!-- Tile 2 -->
    <AdaptationSet segmentAlignment="true" subsegmentAlignment="true"
subsegmentStartsWithSAP="1">
        <SupplementalProperty schemeIdUri="urn:mpeg:dash:srd:2014"
value="0,1,0,1,1,2,2,1"/>
...
    </AdaptationSet>
    <!-- Tile 3 -->
    <AdaptationSet segmentAlignment="true" subsegmentAlignment="true"
subsegmentStartsWithSAP="1">
        <SupplementalProperty schemeIdUri="urn:mpeg:dash:srd:2014"
value="0,1,1,1,1,2,2,1"/>
...
    </AdaptationSet>
    <!-- Tile 4 -->
    <AdaptationSet segmentAlignment="true" subsegmentAlignment="true"
subsegmentStartsWithSAP="1">
        <SupplementalProperty schemeIdUri="urn:mpeg:dash:srd:2014"
value="0,0,1,1,1,2,2,0,0"/>
...
    </AdaptationSet>
    </Period>
</MPD>
```

In the first, three embodiments discussed above, the priority information can be used by e.g. clients and Edge servers 70 to determine which tiles/ROIs to pre-fetch or not pre-fetch from the origin 50 or other cases. I.e., the priority information could be used as a binary indication.

However, since the priority parameter can be several bits it is also possible to indicate several priority levels. This allows for assigning different priorities to different tiles/ROIs, which can be used for pre-fetching first the most important parts, then the second most important parts, then the third most important parts, etc.

Furthermore, or alternatively, the priority information can also be used to indicate different priorities for different quality levels. For example, tiles/ROIs that should be fetched with high quality could be assigned a high priority value while tiles/ROIs that may be fetched with a lower quality could be assigned a lower priority value. An Edge 70 could fetch and cache the full video at the lower quality level and the important tiles/ROIs at the higher quality level.

In cases where clients, Edges and/or other network nodes evaluates the available transmission capacity, the priority information can also be used to decide which parts to pre-fetch depending on the available capacity. For example, always (or often) pre-fetch the high-priority parts but pre-fetch the less important parts only when the capacity allows for it.

Correspondingly, caches (e.g. in the Edge) could also use the priority information to decide which parts to send to the client. Similarly, the origin could also use the priority information to decide which parts to send to the caches.

In the last two embodiments discussed above, the priority information is extended to be also used for several users and larger groups. When several users have similar preferences, it is likely that they want to watch the same content, e.g. for replays of events happening in sports. The priority information can be used, e.g. by the origin, to ensure that the replays are pre-loaded into the caches and thereby immediately available to the user when they request it. The priority information can then be used by intermediate network nodes to know which media items to prioritize when delivering the media to the caches, even if the intermediate network nodes do not know the reason for the higher priority.

Caches can also use the priority information to determine which media items that should be cached or cached for a longer time than other media items. Thereby, it is possible to increase the relevance of the cached content and the cache re-use.

In the embodiment, above relating to the plurality of channels, the priority information is used in a similar was as for the first and second embodiments, except that it is used for media channels instead of tiles/ROIs. The main media channel(s) may be assigned a higher priority while e.g. channels which are less likely to requested by the user may be assigned a lower priority. This enables utilizing the transport resources and caches in a better way, especially for cases when the transport resources may be limited.

Figure 7:
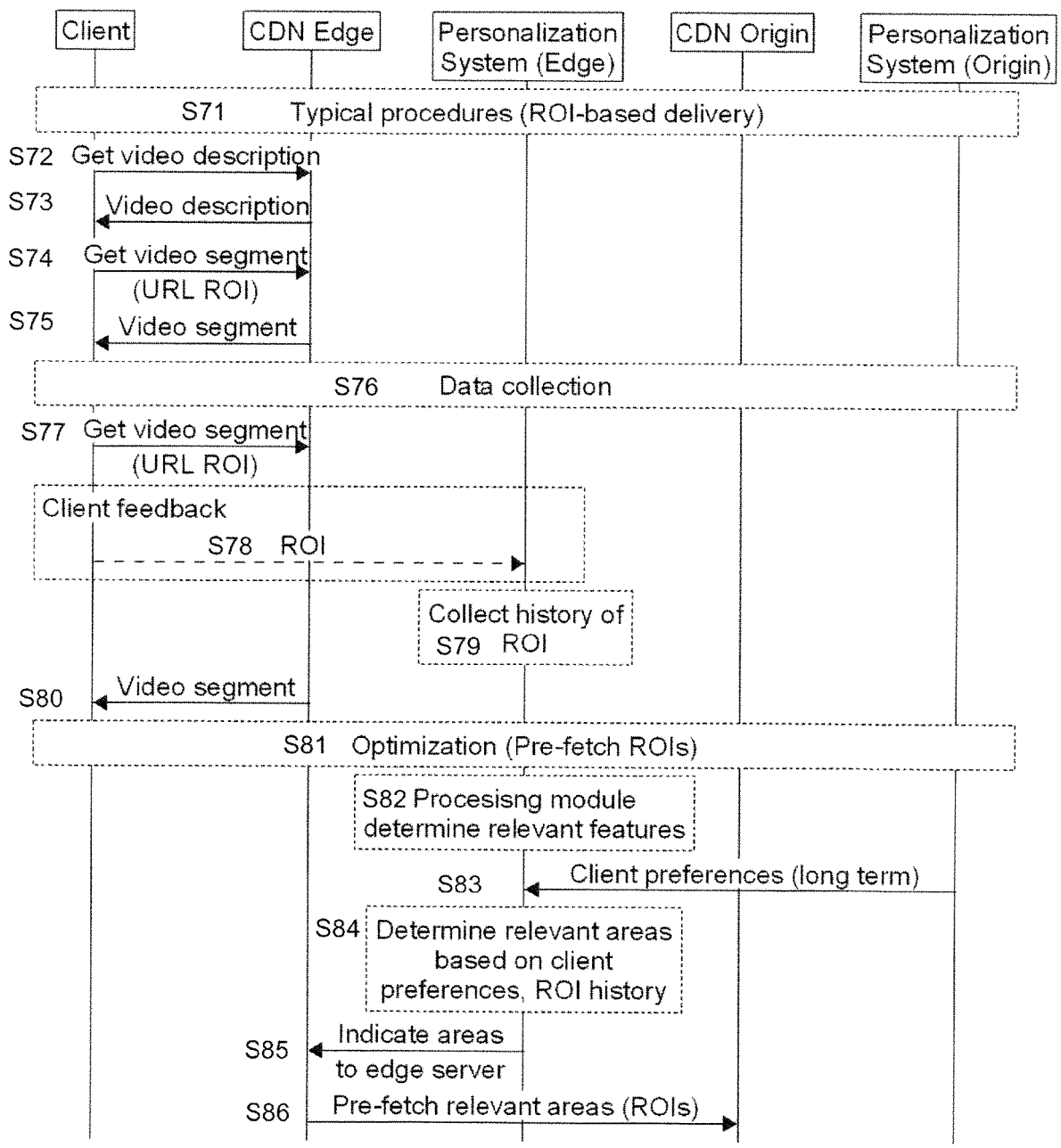
FIG. 7 shows a schematic message exchange between involved entities when a video content is personalized for a user based on user preferences and consumption behavior.

In the following different call flows are discussed. FIG. 7 shows a message exchange between the entities involved shown in FIGS. 3 and 5 in which the spatially more important part determined based on the user preferences are provided to the edge server 70 so that a faster delivery to the user is possible. In step S71 a region of interest based delivery is used between the entities involved. In step S72 the client or user requests a video from the edge server. In step S73 the video description is sent back to the client. In step S74 the video segment URLs is transmitted to the edge server and the segment is transmitted back to client in step S75. In step S76 data is collected and in step S77 a further client request for video segment is transmitted to the edge server, as the client is requesting multiple segments in a single session, wherein a segment duration may be typically between 2 to 10 seconds. The data collection is describing the client feedback to the personalization system. The client can give feedback periodically to the system.

In step S78 user preference information is collected by the personalization entity located close to the edge server, e.g. the region of interests or tiles which the user is looking at. In step S79 the history of the user preferences is collected by the personalization entity. In step S80 a further video segment is transmitted to the client. In step S81 an optimization step is carried out in which region of interests of higher relevance or tiles of higher relevance are pre-fetched. The personalization entity at the edge server then determines the spatially more relevant parts by step S83 and the personalization entity at the origin furthermore provides the long-term user preferences which indicates the spatially more relevant parts determined based on viewing habits in the past (step S83).

In step S84 the relevant areas of the spatially more relevant part in a video frames is determined based on the determined user preference information including the viewing habits in the present viewed and based on viewing habits of this user of other videos. The spatially more relevant part is then indicated in step S85 to the edge server which can pre-fetch the spatially more relevant part from the origin in step S86.

Figure 8:
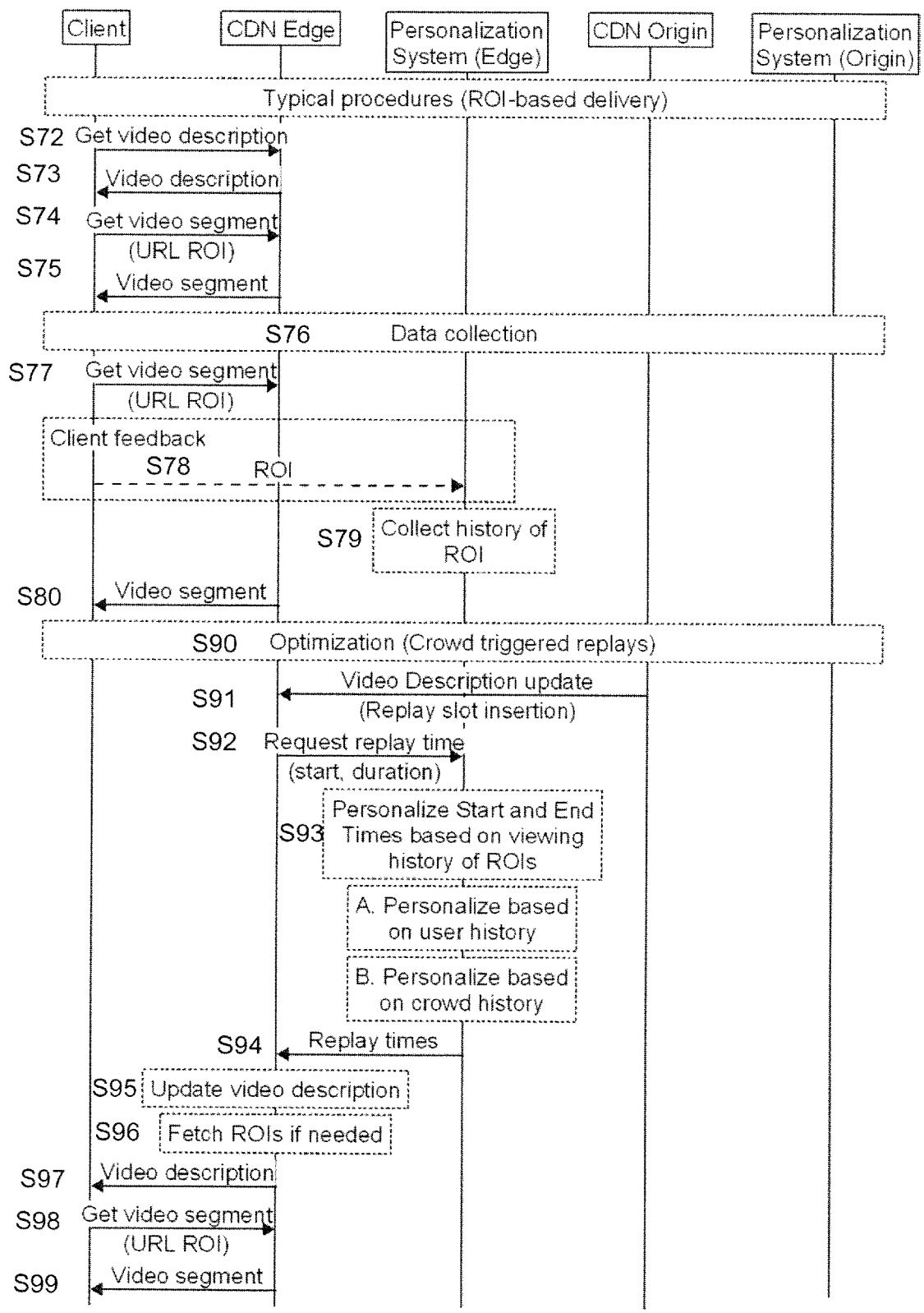
FIG. 8 shows an example message exchange between the involved entities when user preferences from several users are taken into account.

FIG. 8 shows a message exchange between the involved entities for a crowd-triggered replay based on user interests and a viewing history. The personalization entity at the edge determines the replay's start time and the duration and the video description is updated at the edge server. In FIG. 8 the first steps S71 to S80 correspond to the steps discussed above in connection with FIG. 7 and are not discussed in detail anymore. In step S90 information about replays by other users of the same video stream is collected. In step S91 a video description update is sent to the edge server and in step S92 a request for the replay time with the start time and the duration of the replay is transmitted to the personalization entity. Step S92 the start and the end times of the replays are personalized based on the viewing history by the user and other users watching the same content (step S93). This presentation step can include a step A with a personalization based on the users history step B and based on the crowd history. The replay times are then transmitted in step S94 to the edge server where the video description is updated in step S95 and the corresponding parts of the video are fetched if needed in step S96. The video description is sent to the user in step S97 and the user can then request in step S98 the corresponding replay and the replay is sent to the user in step S99.

Figure 9:
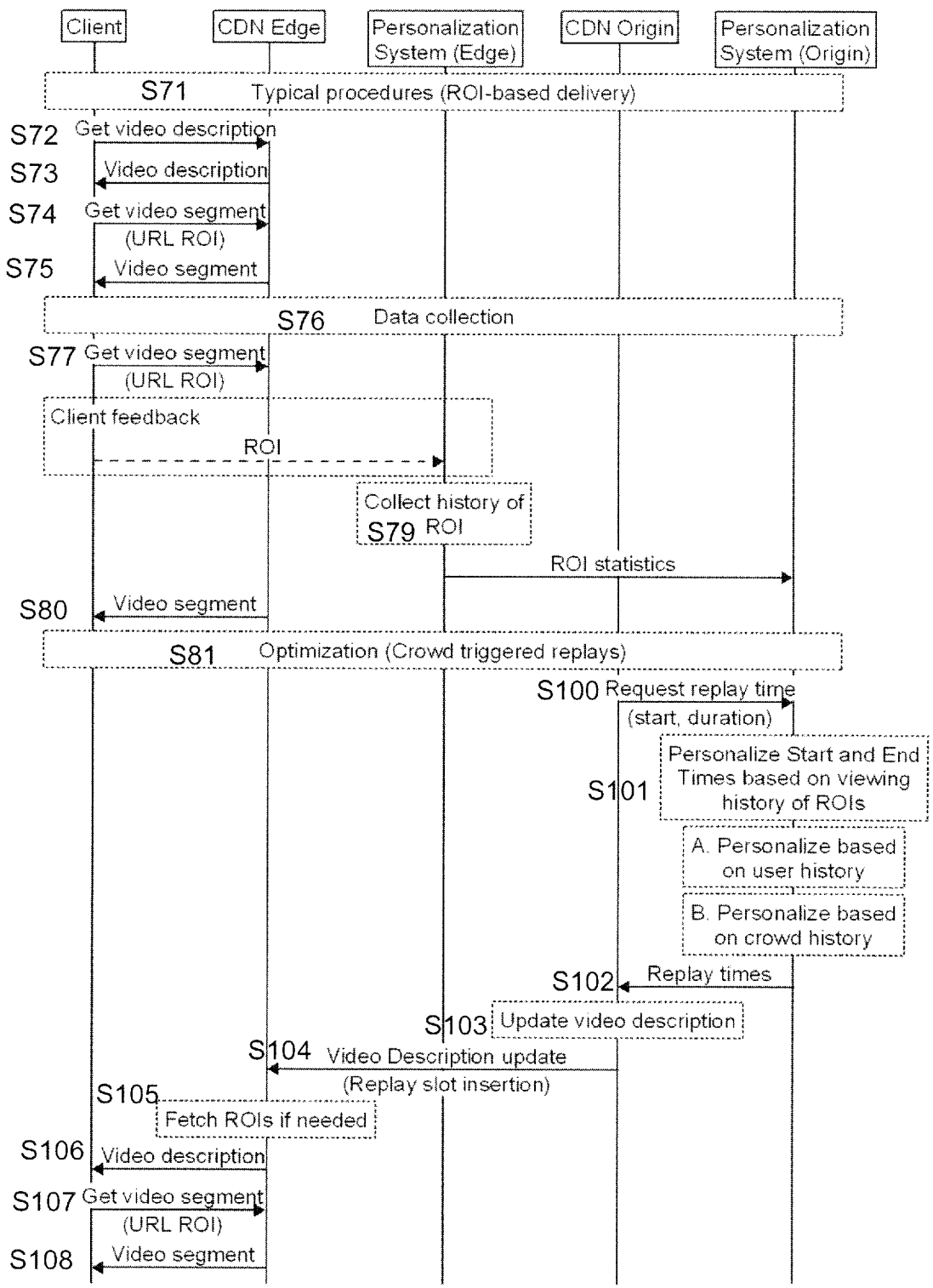
FIG. 9 shows a schematic message exchange between involved entities when the video stream is personalized taking into account replays used by other users.

FIG. 9 shows a message flow for an embodiment where crowd-triggered replays are generated based on the user interests and viewing history. The personalization entity at the origin determines the replays start time and the duration and the video description is updated at the origin. In the embodiment shown in FIG. 9 the personalization entity at the edge provides the personalization entity at the origin with the statistics about the spatially more relevant part or region of interests viewed by the user. The origin server then interacts with the personalization entity at the origin to determine the replay times. Steps S71 to step S81 corresponds to the steps S71 to S81 shown in FIGS. 7 and 8 respectively and are not discussed in detail anymore. In step S100 the origin request with the start time and the duration is transmitted to the personalization entity. At the origin the personalization entity at the origin personalizes the start and end times for the replay based on the viewing history of the more relevant parts in the video wherein this step can be carried out based on the viewing history of the user and based on the viewing history of the crowd (step S101). The replay times are then transmitted to the origin server in step S102 where the video description is updated in step S103. The update is then transmitted from the origin to the edge server in step S104 and in step S105 the corresponding region of interests or replays are fetched by the edge server if needed. In step S106 the video description is transmitted to the client and the client can then request the replay in steps S107 and S108.

Figure 10:
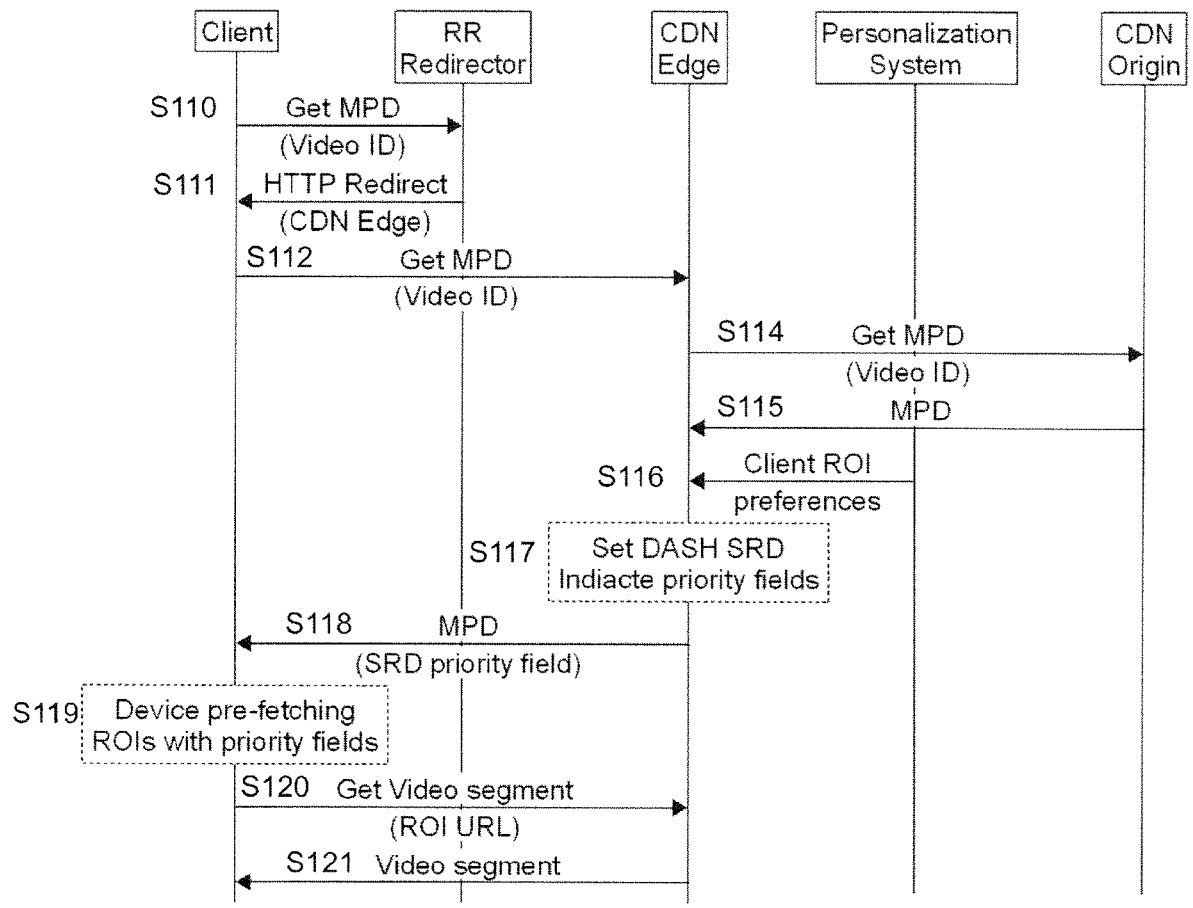
FIG. 10 shows a schematic representation of a message exchange between the involved entities when the video stream is personalized in which priority fields are used to indicate the spatially more relevant parts in the video stream provided by an edge server.
Figure 11:
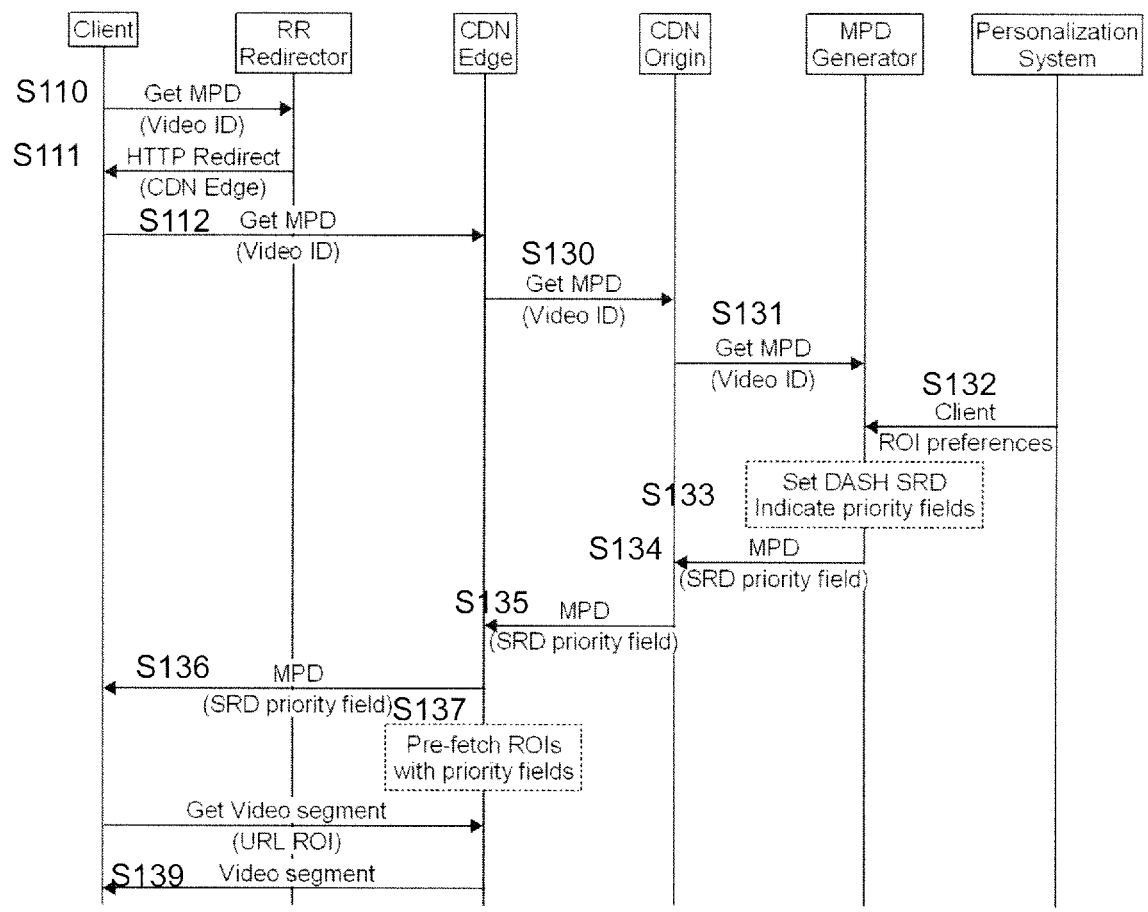
FIG. 11 shows an example message exchange between the involved entities wherein priority information about spatially relevant parts are provided by an origin server.

FIGS. 10 and 11 show the message exchange for the DASH SRD extensions to include priority information about the importance of the spatially more relevant part in the video stream. The figures indicate how to indicate the priority fields based on the proposed methods by edge server and a network and by the origin server respectively. When the DASH SRD priority fields are set by the origin, the caches along the path can use the priority fields to apply optimization such as to pre-fetching at high quality of the high priority parts. In case the DASH SRD fields are set by the edge server the client devices can start applying optimizations such as pre-fetching at high quality of high priority region of interests, tiles or replays. In step 110 of FIG. 10 a request to obtain a media presentation description, MPD including the video ID is transmitted to a redirector which provides an answer in step S111 including the address of the edge server. The request redirector is a CDN edge server which has the functionality to redirect a user to an appropriate edge. In step S112 the a new request for the video is performed by the client to the edge server. The edge server forwards the request in step S113 to the origin 50 which provides in step S114 the answer including the MPD. The personalization entity provides the client preferences to the edge server in step S115 and the edge server sets the DASH SRD such a rate so as to indicate the priority fields as shown above in table 1 or 2 (step S116). The edge server then transmits the media presentation description including the priority filed to the client in step S117 and in step S118 the client can pre-fetched the more relevant parts based on the priority fields. Last but not least, the client can then fetch the video segments based on the priority fields in step S119 and S120.

Making reference to FIG. 11 steps S110 to step S112 correspond to the steps discussed in connection with FIG. 10. In step S130 the edge server requests the MPD including the video ID from the origin which forwards it in step S131 to the MPD generator 80. The personalization entity provides the client preferences in step S132 and the MPD generator then sets the DASH SRD with the corresponding priority fields in step S133. In step S134 to S136 the video presentation description including the priority field is transmitted to the client. The edge server can then pre-fetch the more relevant parts indicated by the priority fields in step S137 and the client can then fetch the more relevant part based on the indicated priority filed in steps S138 and S139.

Figure 12:
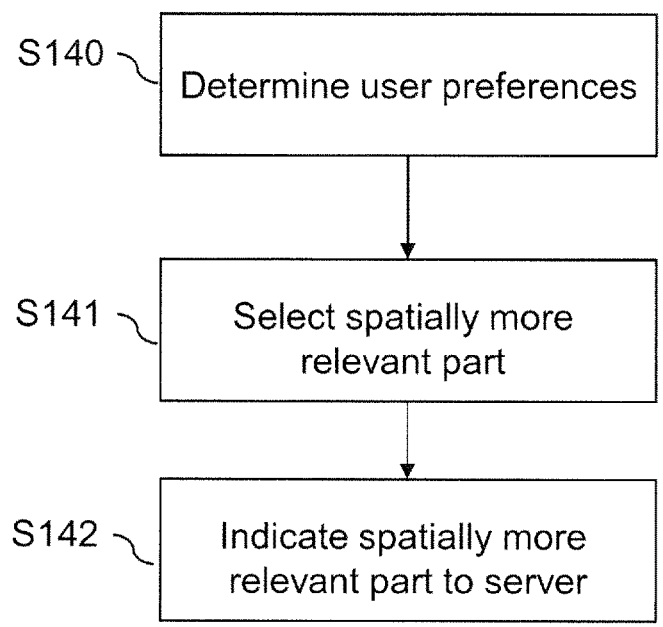
FIG. 12 shows an example representation of a flowchart including steps carried out by a personalization entity when personalizing a video stream for a user.

FIG. 12 summarizes some of the steps carried out by the personalization entity, be it the personalization entity located close to the edge inside the CDM network or be it the personalization entity located outside the network close to the origin. In step S140 user preferences are determined for watching a video stream wherein the user preferences may include the long-term user preference taking into account human habits identified based on other media streams of the same user and or short term user preferences indicating the spatially more relevant part in earlier video frames of the same video stream. In step S141 the spatially more relevant part in the video frame is selected based on the user preferences and in step S142 the information about the spatially more relevant part is indicated to the video providing entity which may be the origin 50 order to edge server 70.

Figure 13:
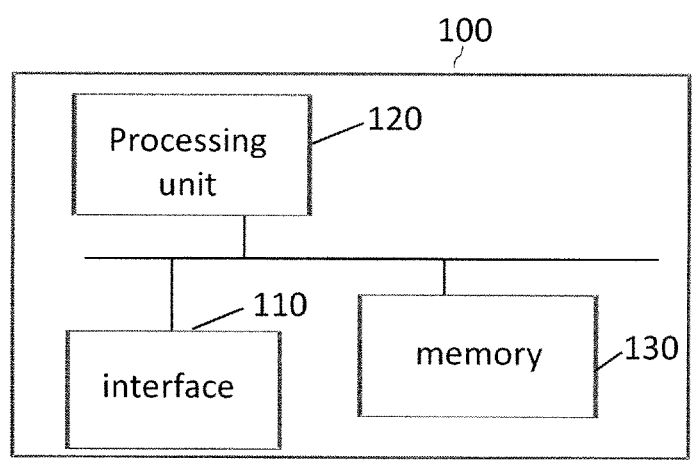
FIG. 13 shows a schematic representation of a personalization entity configured to personalize a video stream for a user.

FIG. 13 shows a schematic overview of a personalization entity which can carry out the above discussed steps in which the personalization entity at the origin or at the edge are involved. The personalization entity 100 comprises an interface 110 which is provided for transmitting user data such as video data or control messages to other entities such as the entities shown in FIGS. 3 and 5 wherein the interface 110 furthermore is provided to receive user data such as video data and control messages from other entities. The personalization entity furthermore comprises a processing unit 120 which is responsible for the operation of the personalization entity. The processing unit 120 can comprise one or more processors and can carry out instructions stored on a memory 130, wherein the memory may include a read-only memory, random access memory, a mass storage, hard disk or the like. The memory 130 can furthermore comprise suitable program code to be executed by the processing unit 120 so as to implement the above described functionalities in which the personalization entity is involved.

Figure 14:
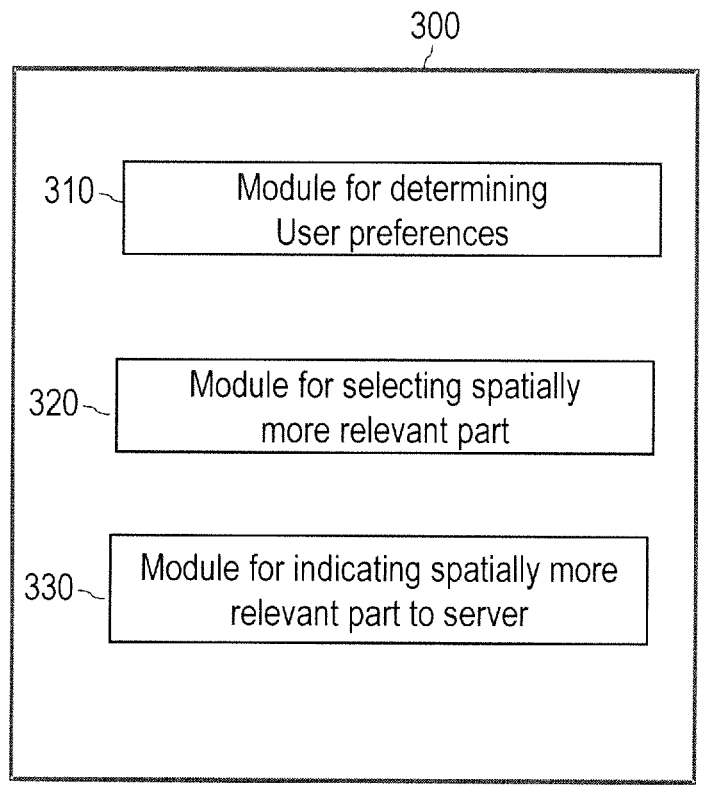
FIG. 14 shows another example schematic representation of a personalization entity configured to personalize a video stream for a user.

FIG. 14 shows a further embodiment of a personalization entity 300. The personalization entity 300 comprises a module 310 for determining the user of preferences which can include the determination of the long-term and or short-term user preferences. A module 320 is provided for selecting the spatially more relevant part and the module 330 is provided for indicating the spatially more relevant part to the server from where the video stream is transmitted to the user.

Figure 15:
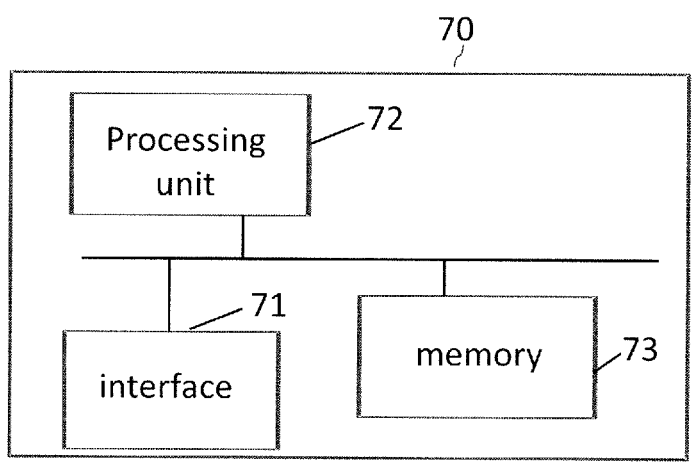
FIG. 15 shows a schematic representation of an edge server configured to add priority information to the video stream.

FIG. 15 shows an embodiment of an edge server 70 which is configured to carry out the above discussed steps in which edge server 70 is involved. The edge server 70 comprises an interface 71 provided for transmitting user data such as the video stream to the user and provided for transmitting control messages to other entities such as the entities shown in FIGS. 3 and 5 wherein the interface 71 is furthermore provided to receive user data such as the video stream from the origin or control messages from the origin or other entities. The edge server 70 furthermore comprises a processing unit 72 which is responsible for the operation of the edge server. The processing unit 72 can comprise one or more processors and can carry out instructions stored on memory 73 wherein the memory may include a read-only memory, random access memory, a mass storage, hard disk or the like. The memory 73 can comprise suitable program code to be executed by the processing unit 72 so as to implement the above described functionalities in which the edge server is involved. The memory 73 may furthermore store the video stream that is provided to the user wherein different parts of the video stream may be stored in a different viewing quality depending on the fact whether it's a spatially more relevant part or a spatially less relevant part. The processing unit is furthermore configured to assign the priority information to the spatially more relevant part as discussed above.

Figure 16:
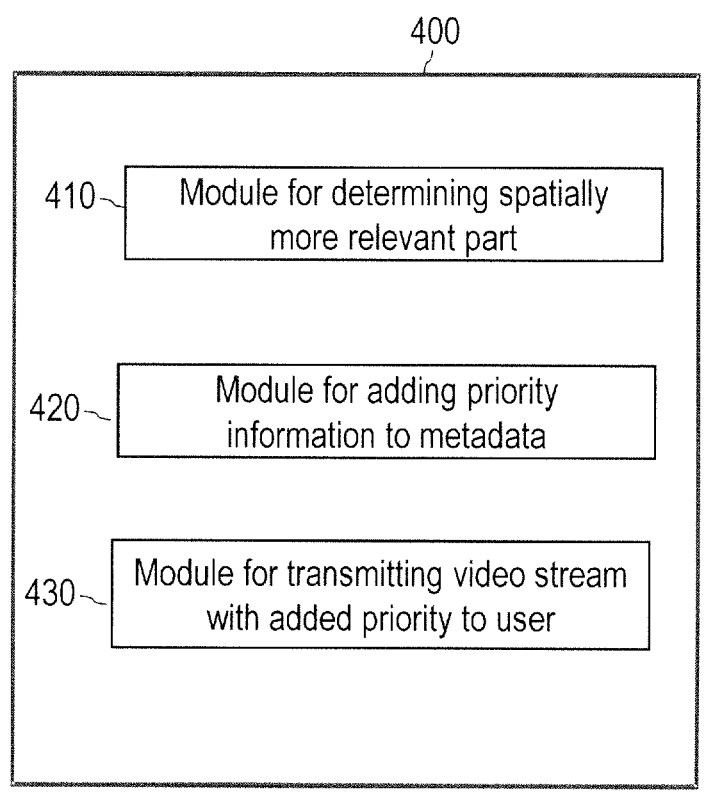
FIG. 16 shows another schematic representation of an edge server configured to add priority information to the video stream.

FIG. 16 shows a further embodiment of an edge server 400. The edge server comprises a module 410 for determining the spatially more relevant part. This information may be determined by analyzing the user requests or may be determined by the personalization entity and transmitted to the edge server or requested by the edge server. Furthermore, a module 420 is provided which adds the priority information to the meta data which identifies the spatially more relevant part in the video frames identified by module 410. Furthermore, a module 430 is provided transmitting the video stream with the added priority information to the user. Preferably, the module 420 for adding the priority information adds the priority information to media presentation description, preferably as an extension to the DASH SRD field.

It should be noted that the entities discussed in FIGS. 13 to 16 can comprise additional functional modules which were however not discussed for the sake of clarity. Furthermore, the functional entities shown in FIGS. 13 and 14 may be incorporated by software, hardware, or combination of hardware and software.

From the discussion of the present application mentioned above some general conclusions can be drawn.

As far as the personalization entity is concerned the determining of the user preference information can comprise determining a long-term user preference indicating the spatially more relevant parts determined based on viewing habits detected when viewing a plurality of video streams in the past. The determination of the user preference information can furthermore comprise determining a short-term user preference indicating the spatially more relevant parts in earlier video frames of the video stream which the user is currently viewing. The determining of the user preferences, the selection of the spatially more relevant part and the indicating of the more relevant part may be carried out by the personalization entity located close to the origin outside the network or located close to the edge server and connected to the edge server located inside the network 60. It is possible to indicate the spatially more relevant part to a first video providing entity, here the edge server which only stores the spatially more relevant part of the video stream does not store the whole video stream for the user.

The personalization entity may be located in the content delivery network as long as the video stream is consumed by the user whereas the personalization entity is located outside the content delivery network when the video stream is not consumed by the user. This means that part or the complete functionality of the personalization entity is moved closer to the entity which provides the video stream to the user so that the delay times are minimized.

In other words the personalization entity is located at a closer distance to the video providing entity as long as the video stream is consumed by the user compared to a location of the personalization entity when the video stream is not consumed by the user.

The first video providing entity may be an edge server located in an edge of the content delivery network through which the video stream is delivered the user wherein the edge server is located closer to the user then a second video providing entity, the origin which stores the complete video stream for the user.

When the user preference information is determined it is possible that it is determined which spatial part of the content present in the video frame was of higher relevance for other users viewing the same video stream.

Furthermore, a sequence of video frames in the video stream may be determined which was viewed repeatedly by other users when viewing the same video stream wherein the sequence of video frames with a starting time and an end time is indicated to the video providing entity, e.g. the edge server. The sequence of video frames, e.g. the replays may be indicated to the video providing entity, the origin or edge server as the spatially more relevant part which had a higher viewing relevance to other users when viewing the same video stream.

Furthermore, it is possible that the video stream comprises a main channel which is common for several users and at least one personalized channel in which additional information relating to the same video stream is provided. The additional information may also relate to another channel. Based on a user feedback the main channel or the personalized channel may be indicated to the video providing entity.

The spatially more relevant part of the video frame may be delivered to the user in a higher viewing quality than the remaining part of the video frames. The video stream comprising the different video frames may be a 360 degree video stream. However, the video stream may be much video stream which could include text or geographical overlays or audio components which are presented only when the corresponding video object generating the audio component is in the viewport. In general the video stream has a format such that it is larger than what can be displayed on a display and what can be viewed by a user so that the user either has to scroll up or down or left and right to see other parts of the video stream or has to change the head direction if a head mounted display is used.

As far as the edge server is concerned the edge server may prefetch the spatially more relevant part from a second video providing entity, here the origin, which stores the whole video stream for the user. The prefetching may be done based on the priority information contained in the meta data of the video stream and may be carried out before the edge server starts actually transmitting the video stream to the user.

Furthermore, it is possible that the edge server assigns different priority levels to different spatial parts of the frames in dependence on a viewing relevance of the corresponding spatial parts in the video frames. The highest priority level may be assigned to the viewport wherein the second highest priority level may be assigned to the regions directly bordering to the viewport wherein the lowest priority level or no priority level may be assigned to the remaining portions of the video frames located further away from the viewport.

Furthermore, the edge server may fetch the different spatial parts of the video stream from the second video providing entity such as the origin in dependence on the priority level assigned to the corresponding spatial part of the video stream. The spatially more relevant part may be prefetched first wherein the remaining parts may be either not prefetched at all or maybe prefetched if the network capacity allows etc.

The edge server may furthermore prefetch the spatially more relevant part from the second video providing entity such as the origin in a higher viewing quality than the remaining part wherein the spatially more relevant part can be determined based on the priority information added to the meta data of the stream.

The edge server may furthermore store only the spatially more relevant part in a cache memory based on the received priority information wherein the remaining part of the video frames may not be stored in the cache memory.

Furthermore, the replay mode which corresponds to a sequence of video frames in the video stream which was viewed repeatedly by other users may be identified based on the priority information added to the sequence of video frames.

Furthermore, the video frame may comprise a main channel common to several users and at least one personalized channel in which additional information specific to the user is provided. The edge server can identify the personalized channel based on the priority information added to the personalized channel.

As far as the system comprising the personalization entity and edge server are concerned a first embodiment is possible in which the personalization entity is provided locally during use at the edge server. The viewport may be predicted or is known from the user preferences and the viewing history as provided by the local personalization entity. The edge server cache may store the viewpoint at a higher viewing quality or the highest viewing quality whereas the surrounding portions surrounding the viewport are stored at a medium quality and the remaining portions still outside the surrounding portions are stored in a lower quality. The edge server may furthermore transmit the viewport at the high quality, the surrounding portions at the medium quality and the remaining portions at the low quality to the user. Furthermore, it is possible that the edge server only sends the viewport to the user wherein the other parts outside the viewport may only be sent when the user changes the viewport.

Furthermore, an embodiment is possible were the edge server connected to the local personalization entity fetches the viewport in high quality stored in a cache provided in a backbone system which stores the entire video stream at high quality, medium quality and low quality. The edge server then fetches the high quality part for the viewport and the medium quality for the surrounding areas from the backbone cache. Compared to the examples above the edge can fetch the content from the cache faster than from the origin.

The above discussion provides a solution to improve the delivery of personalized and interactive video streams. The method allows a content provider or CDN to optimize the delivery of the video stream by fetching parts of the video stream relevant to the a user or to a group of users. The personalization entity may be provided at or close to an edge server in order to provide an improved viewing experience as the time for rendering more important part is minimized. Furthermore, it is described how replays are tailored to crowd preferences. Additionally improved prefetching procedures for the video stream are described and a multichannel personalization.

The priority information may be indicated in the DASH SRD based on the feedback from the personalization entity. An additional field may be added to the DASH SRD specification to indicate the more relevant part in the MPD.

The above described approaches allow a network to fetch and send the more relevant parts with low delay and at a high quality. In case of a limited transport capacity the priority information can also be used to select which media items should be pre-fetched such that the available transport capacity is mainly used for the more relevant parts and not for the less relevant parts. The priority information can also be used in caching the high priority part of the video stream such that these parts are cached for a longer time wherein the other parts not including the high-priority parts of cached for a shorter time or not at all. The priority information can thus be use to increase the likelihood that the cached content is relevant also for other users. This means that the load on the network from the origin to the cache is further reduced.

The invention claimed is:

1. A method for personalizing a video stream for a user, wherein the video stream comprises a set of two or more spatial objects, the set of two or more spatial objects comprising a first spatial object corresponding to a first spatial part of the video stream and a second spatial object corresponding to a second spatial part of the video steam, the method comprising:
obtaining user preference information which indicates which of the spatial objects is of higher relevance to the user than other spatial objects;
for at least the first spatial object, assigning a priority value to the first spatial object based on the obtained user preference information;
providing to a video providing entity from where the video stream is delivered to the user a message comprising: a position value identifying a position of the first spatial object in a coordinate system associated with the video stream, a width value identifying a width of the first spatial object, a length value identifying a length of the first spatial object, and the priority value assigned to the first spatial object.

2. A personalization entity configured to personalize a video stream for a user, wherein the video stream comprises a set of two or more spatial objects, the set of two or more spatial objects comprising a first spatial object corresponding to a first spatial part of the video stream and a second spatial object corresponding to a second spatial part of the video steam, the personalization entity comprising:
a memory; and
at least one processor, the memory containing instructions executable by the at least one processor,
wherein the personalization entity is configured to:
obtain user preference information which indicates which of the spatial objects is of higher relevance to the user than other spatial objects,
for at least the first spatial object, assign a priority value to the first spatial object based on the obtained user preference information,
provide to a video providing entity from where the video stream is delivered to the user a message comprising: a position value identifying a position of the first spatial object in a coordinate system associated with the video stream, a width value identifying a width of the first spatial object, a length value identifying a length of the first spatial object, and the priority value assigned to the first spatial object.

3. The personalization entity of claim 2, wherein the personalization entity is configured, for obtaining the user preference information, to determine a long term user preference indicating one or more spatial objects of higher relevance determined based on viewing habits detected when viewing a plurality of video streams in the past, and to determine a short term user preference indicating one or more spatial objects of higher relevance in earlier video frames of the video stream which the user is currently viewing.

4. The personalization entity of claim 2, wherein the personalization entity is further configured to be located in a content delivery network which delivers the video stream to the user, as long as the video stream is consumed by the user, wherein the personalization entity is located outside the content delivery network when the video stream is not consumed by the user.

5. The personalization entity of claim 2, wherein the personalization entity is configured to be located at a closer distance to the video providing entity as long as the video stream is consumed by the user, compared to a location of the personalization entity when the video stream is not consumed by the user.

6. The personalization entity of claim 2, wherein the personalization entity is configured to indicate one or more spatial parts of the video stream corresponding to the spatial objects of higher relevance to a first video providing entity which only stores said one or more spatial parts the of the video stream and does not store the whole video stream for the user.

7. The personalization entity of claim 6, wherein the first video providing entity is an edge server located at an edge of a content delivery network through which the video stream is delivered to the user as long as the user is consuming the video stream and is located closer to the user than a second video providing entity which stores the complete video stream for the user.

8. The personalization entity of claim 2, wherein the personalization entity is configured, for obtaining the user preference information, to determine which spatial part of content present in the video frames was of higher relevance to other users viewing the same video stream.

9. The personalization entity of claim 2, wherein
the personalization entity is configured to determine a sequence of video frames in the video stream which was viewed repeatedly by other users when viewing the same video stream, and configured to indicate the sequence of video frames with a starting time and an end time to the video providing entity, and
the personalization entity is configured to indicate the sequence of video frames to the video providing entity with one or more spatial parts of the video stream which had a higher viewing relevance to the other users when viewing the same video stream.

10. The personalization entity of claim 2, wherein the video stream comprises a main channel which is common for several users and at least one personalized channel in which additional information relating to the same video stream is provided, wherein the personalization entity is configured to indicate the main channel or the personalized channel to the video providing entity based on a user feedback.

11. The personalization entity of claim 2, wherein the personalization entity is configured to deliver one or more spatial parts of the video stream corresponding to the spatial objects of higher relevance to the user in a higher viewing quality than the remaining part in the video frames.

12. A method for a content delivery network for delivering a video stream to a user, wherein the video stream comprises a set of two or more spatial objects, the set of two or more spatial objects comprising a first spatial object corresponding to a first spatial part of the video stream and a second spatial object corresponding to a second spatial part of the video steam, the method comprising:
receiving a request for metadata;
obtaining user preference information which indicates which of the spatial objects is of higher relevance to the user than other spatial objects;
generating metadata based on the obtained user preference information; and
transmitting the generated metadata, wherein
the metadata comprises: a position value identifying a position of the first spatial object in a coordinate system associated with the video stream, a width value identifying a width of the first spatial object, a length value identifying a length of the first spatial object, and a priority value assigned to the first spatial object.

13. The method of claim 12, wherein the obtained user preference information includes the priority value assigned to the first spatial object.

14. The method of claim 12, the method further comprising determining the priority value assigned to the first spatial object based on the obtained user preference information.

15. A system located in a content delivery network configured to deliver a video stream to a user, wherein the video stream comprises a set of two or more spatial objects, the set of two or more spatial objects comprising a first spatial object corresponding to a first spatial part of the video stream and a second spatial object corresponding to a second spatial part of the video steam, the system comprising:

a memory; and at least one processor, the memory containing instructions executable by the at least one processor, wherein the system is configured to:

receive a request for metadata;

obtain user preference information which indicates which of the spatial objects is of higher relevance to the user than other spatial objects;

generate metadata based on the obtained user preference information; and transmit the generated metadata, wherein, the metadata comprises: a position value identifying a position of the first spatial object in a coordinate system associated with the video stream, a width value identifying a width of the first spatial object, a length value identifying a length of the first spatial object, and a priority value assigned to the first spatial object.

16. The system of claim 15, wherein the system is further configured to pre-fetch one or more spatial parts corresponding to the spatial objects of higher relevance from a second video providing entity storing the whole video stream for the user based on priority information before the system starts transmitting the video stream to the user.

17. The system of claim 15, wherein the system is further configured to:

assign different priority levels to different spatial parts of the video frames in dependence on a viewing relevance of the corresponding spatial parts in the video frames; and fetch different spatial parts of the video stream from a second video providing entity storing the whole video stream for the user, wherein the fetching is carried out in dependence on the priority level assigned to the corresponding spatial part of the video stream.

18. The system of claim 15, wherein the system is further configured to fetch one or more spatial parts corresponding to the spatial objects of higher relevance from a second video providing entity storing the whole video stream for the user in a higher viewing quality than the remaining part based on the priority information.

19. The system of claim 15, wherein the system is further configured to store only one or more spatial parts corresponding to the spatial objects of higher relevance in a cache memory for transmission to the user, and not to store the remaining part in the video frames in the cache memory.

20. The system of claim 15, wherein the system is further configured to identify a sequence of video frames in the video stream which was viewed repeatedly by other users in a replay mode using priority information added the sequence of video frames.

21. The system of claim 15, wherein the video stream comprises a main channel which is common for several users and at least one personalized channel in which additional information specific to the user is provided, wherein the system is configured to identify the personalized channel based on priority information added to the personalized channel.

22. A computer program product comprising a non-transitory computer readable medium storing a computer program comprising program code to be executed by at least one processor of a personalization entity, wherein execution of the program code causes the at least one processor to execute the method of claim 1.

* * * * *